United States Patent
Greene et al.

(10) Patent No.: US 11,602,894 B2
(45) Date of Patent: Mar. 14, 2023

(54) DETECTING LACK OF ADHESION OF A BUILD PLATE TO A SUPPORT BED

(71) Applicant: Essentium, Inc., Pflugerville, TX (US)

(72) Inventors: Jason Greene, Huntington Beach, CA (US); Yasushi Mizuno, Houston, TX (US)

(73) Assignee: ESSENTIUM IPCO, LLC, Pflugerville, TX (US)

(*) Notice: Subject to any disclaimer, the term of this patent is extended or adjusted under 35 U.S.C. 154(b) by 0 days.

(21) Appl. No.: 17/351,681

(22) Filed: Jun. 18, 2021

(65) Prior Publication Data

US 2022/0402207 A1    Dec. 22, 2022

(51) Int. Cl.
| | |
|---|---|
| *B29C 64/245* | (2017.01) |
| *B29C 64/118* | (2017.01) |
| *B29C 64/25* | (2017.01) |
| *B33Y 40/00* | (2020.01) |
| *B33Y 30/00* | (2015.01) |

(52) U.S. Cl.
CPC .......... *B29C 64/245* (2017.08); *B29C 64/118* (2017.08); *B29C 64/25* (2017.08); *B33Y 30/00* (2014.12); *B33Y 40/00* (2014.12)

(58) Field of Classification Search
CPC ...... B29C 64/118; B29C 64/245; B33Y 30/00
See application file for complete search history.

(56) References Cited

U.S. PATENT DOCUMENTS

| | | | |
|---|---|---|---|
| 2015/0210007 A1* | 7/2015 | Durand | B29C 64/118 |
| | | | 425/150 |
| 2016/0052207 A1* | 2/2016 | Bloom | B29C 64/106 |
| | | | 425/3 |
| 2017/0291804 A1* | 10/2017 | Craft | B33Y 99/00 |
| 2020/0247050 A1* | 8/2020 | Mehta | B33Y 30/00 |
| 2022/0048249 A1* | 2/2022 | Klimczak | B29C 64/364 |

FOREIGN PATENT DOCUMENTS

| | | | | |
|---|---|---|---|---|
| CN | 109693380 A | * | 4/2019 | B29C 64/20 |
| CN | 111745958 A | * | 10/2020 | |
| CN | 112590211 A | * | 4/2021 | |
| CN | 112793163 A | * | 5/2021 | |
| JP | 2019034533 A | * | 3/2019 | B29C 64/245 |
| WO | 2020132052 A1 | | 6/2020 | |

* cited by examiner

*Primary Examiner* — Manley L Cummins, IV
(74) *Attorney, Agent, or Firm* — Vivacqua Crane, PLLC (57) ABSTRACT

A three-dimensional printer and a method of leveling a support surface in a three-dimensional printer. The three-dimensional printer includes a base plate, a support bed, including a support surface, wherein the support bed is mounted to the base plate, a plurality of adjustable mounting assemblies adjustably mounting the base plate to the support bed, wherein each adjustable mount assembly separates the base plate from the support bed by a first distance. The three-dimensional printer may further include a vacuum port fluid communication with a vacuum opening, a vacuum pump in fluid communication with the vacuum port, a vacuum regulator coupled to the tubing between the vacuum pump and vacuum port, and a vacuum pressure switch coupled to the tubing between the vacuum regulator and the vacuum port.

16 Claims, 10 Drawing Sheets

DETECTING LACK OF ADHESION OF A BUILD PLATE TO A SUPPORT BED

FIELD

The present disclosure relates to a three-dimensional printer support bed and build plate, and a method for improving the flatness of a support bed and build plate within the three-dimensional printer.

BACKGROUND

In aspects of three-dimensions printing, a three-dimensional object is formed by sequentially layers of a material. Each layer of the material is supported by the layer of material underneath it and where it may not be possible to fully support the material, support structures are incorporated into the design that may be removed after printing is completed. Within the printer, the material is deposited on a build plate, which may be directly or indirectly heated. Ideally, the material adheres to the build plate during printing and then may be removed from the build plate after printing without damaging the printed three-dimensional object. Further, the build plate provides a flat surface to print on or a surface conforming to the geometry of the object that is to be printed.

To increase printer through-put, after forming a three-dimensional object on the build plate, the build-plate may be removed from the three-dimensional printer and replaced with a new build plate. Depending on the type of build plate used, removing the build plate may allow the plate to flex or be conditioned in a process chamber, to facilitate removal of the printed object from the plate. In aspects, the build plate is held within the print chamber by a support bed, wherein the build plate is disposed on a support surface of the support bed. Various solutions have been developed to adhere a build plate to a support bed in a three-dimensional printer. Such solutions include the use of magnetic plates or releasable adhesives.

However, as the temperatures in the printer change, the support bed may warp. Warping of the support bed may lead to warping of the build plate or may cause the build plate to become improperly affixed to the support bed. Warping of the build plate or failure of the build plate to properly adhere to the support bed surface will likely result in printing defects.

Accordingly, while current solutions for improving flatness of the build surface and securing a removable build plate to a support bed of a three-dimensional printer are useful for their intended purpose, there is room in the art for an improved printer design and method for securing a build plate to a support bed.

SUMMARY

According to a number of aspects the present disclosure relates to a three-dimensional printer. The three-dimensional printer includes a base plate and a support bed, including a support surface, wherein the support bed is mounted to the base plate. The three-dimensional printer further includes a plurality of adjustable mounting assemblies mounting the base plate to the support bed, wherein each adjustable mount assembly separates the base plate from the support bed by a first distance.

In aspects of the above, the base plate includes an upper surface and a lower surface opposing the upper surface. In addition, each mounting assembly includes a leveling bolt, wherein the leveling bolt includes a first nut defined at a first end of the leveling bolt and defines a through bore, wherein the leveling bolt passes through the base plate, a threaded rod passing through the through bore defined by the leveling bolt, the threaded rod including a first end and a second end opposing the first end, the first end of the threaded rod affixed to the support plate, a second nut adjustably positioned on the leveling bolt, between the first end of the leveling bold and the lower surface of the base plate, and a third nut affixed to the second end of the threaded rod.

In further aspects of the above, a fourth nut is adjustably positioned on the threaded rod between the base plate and the support plate.

In further aspects of the above, the third nut is a lock nut and the adjustable mounting assembly further includes a cotter pin, wherein the cotter pin is received in an opening defined in the threaded rod.

In further aspects of the above, a mounting bar is affixed to the base plate and the mounting bar is positioned between the support bed and the base plate. In addition, the leveling bolt passes through an opening in the mounting bar.

In any of the above aspects, the three-dimensional printer a print head. The print head is movable in a plane defined by a first axis and a second axis, and the base plate is movable in a third axes orthogonal to the plane.

In any of the above aspects, each adjustable mounting assembly is located at a second distance apart from an adjacent adjustable mounting assembly, wherein the second distance is in a range of 100 mm to 400 mm.

In any of the above aspects, a build plate disposed on the support surface.

In any of the above aspects, the three-dimensional printer includes a vacuum port affixed to the support bed in fluid communication with a vacuum opening defined in the support surface, wherein the build plate is disposed over the vacuum opening, a vacuum pump in fluid communication with the vacuum port wherein the fluid communication is provided by a tubing, a vacuum regulator coupled to the tubing between the vacuum pump and vacuum port, and a vacuum pressure switch coupled to the tubing between the vacuum regulator and the vacuum port.

In aspects of the above, a gasket is affixed to the support surface and the gasket surrounds the vacuum port.

In aspects of the above, the support bed includes grooves defined in the support surface.

In aspects of the above, the vacuum opening is defined in one of the grooves.

In aspects of the above, the vacuum pressure switch exhibits a hysteresis in the range of 0.001 MPa to 0.01 MPa.

In aspects of the above, the three dimensional printer further includes a controller, wherein the controller includes executable code to initialize printing, activate the vacuum pump, determine the state of the vacuum pressure switch; and stop printing if a state of the vacuum pressure switch is changed.

In further aspects of the above, the controller further includes executable code to: provide an indicator the state of the vacuum pressure switch is changed.

According to a number of aspects the present disclosure relates to a method of leveling a build surface in a three-dimensional printer, including the above described three-dimensional printer. The method includes mounting a support bed, including a support surface, onto a base plate using a plurality of adjustable mounting assemblies. The method further includes adjusting a first distance between the base plate and the support bed at each of the plurality of adjustable mounting assemblies and leveling the support surface.

In aspects, the method further includes, adjusting the temperature of the support bed and base plate to an operating temperature prior to adjusting the first distance at each of the plurality of adjustable mounting assembly.

According to a number of aspects the present disclosure relates to a method of determining whether a build plate is sealed to a support bed in a three-dimensional printer, including above described aspects of the three-dimensional printer. The method includes initializing printing of an object, applying a vacuum to a build plate through a vacuum opening defined in a support surface of a support bed, determining if the build plate is sealed to the support surface of the support bed with the vacuum, and stopping printing if the build plate is not sealed to the support surface of the support bed.

In aspects, the method further includes providing an indicator if the build plate is not sealed to the support surface of the support bed.

In aspects, the method further includes applying the vacuum through grooves defined in the support surface, wherein the vacuum openings are defined in the grooves.

In aspects, the method further includes determining if the build plate is sealed to the support surface of the support bed comprises determining the state of a vacuum pressure switch in fluid communication with the vacuum.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

The present disclosure relates to a three-dimensional printer support bed and build plate and a method for improving the flatness of a support bed and build plate within the three-dimensional printer. Further, the present disclosure relates to a three-dimensional printer, a controller, and a method for detecting the lack of adhesion of a build plate to a support bed within the three-dimensional printer. In a number of aspects, the three-dimensional printer uses adjustable mounting assemblies to affix a support bed in the printer and initially level the support surface. In further aspects, the three-dimensional printer also includes a vacuum system for securing the build plate to a support bed. The vacuum system includes a vacuum pressure switch, which provides a signal indicating the state of the vacuum pressure switch to a controller associated with the three-dimensional printer. The controller uses information received from the vacuum pressure switch to determine whether sufficient vacuum is present to secure the build plate to the vacuum support bed and whether printing should commence or be terminated.

Figure 1:
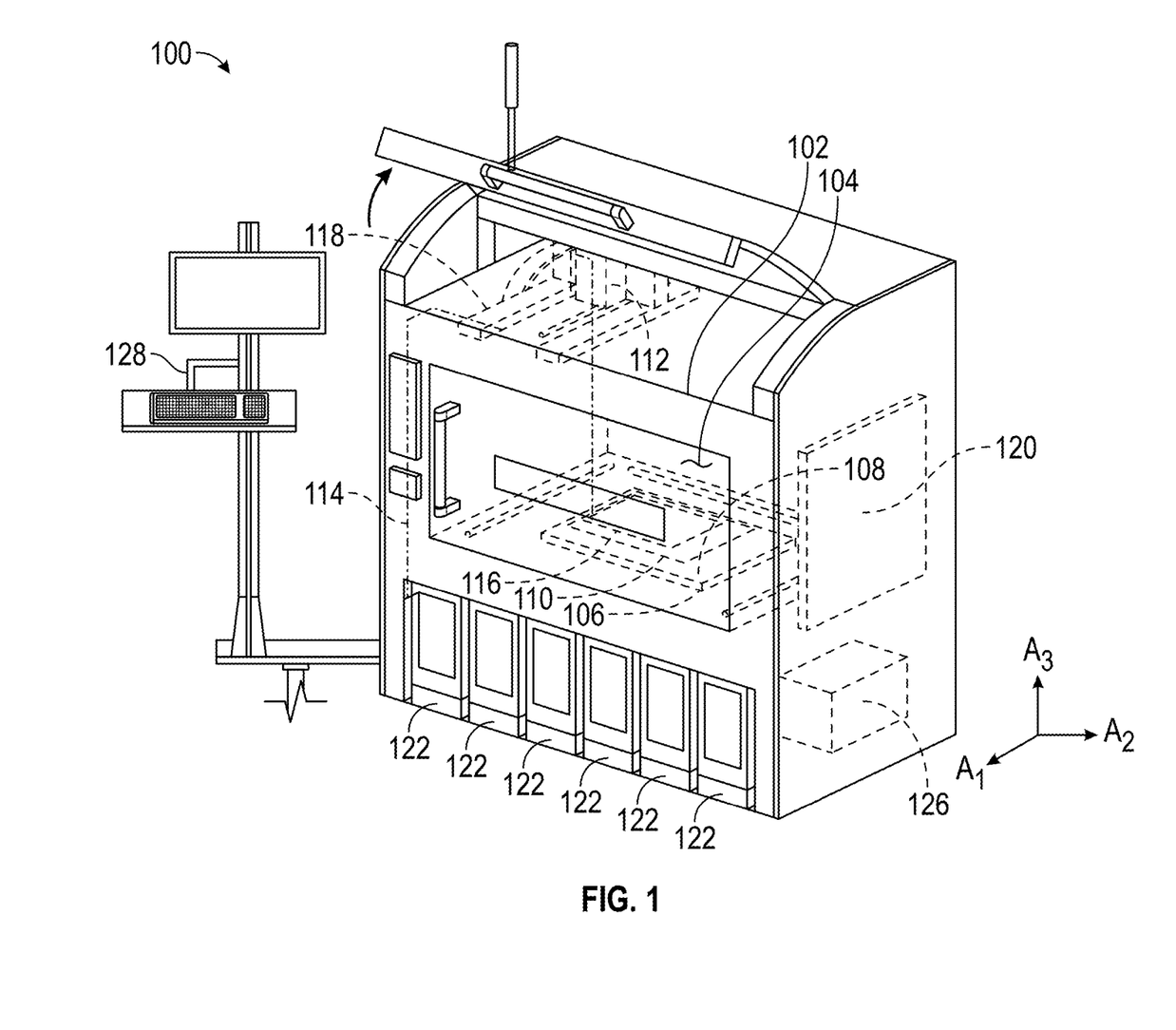
FIG. 1 illustrates a schematic of a three-dimensional printer.

An aspect of a three-dimensional printer is illustrated in FIG. 1. The three-dimensional printer 100 generally includes an enclosure 102 defining a process chamber 104 and a support bed 106 supported within the process chamber 104. The support bed 106 includes a support surface 108 onto which a build plate 110 is placed. The three-dimensional printer 100 further includes a print head 112, which deposits filament 114 onto the build plate 110 to form the three-dimensionally printed object 116. The print head 112 is supported relative to the build plate 110 on an x,y-axis gantry 118 allowing the print head 112 to move in a plane defined by a first axis A1 and a second axis A2. The support bed 106 is moved relative to the print head 112 by a z-axis gantry 120 allowing the support bed 106 to move in a third axis A3 orthogonal to the plane defined by the first axis A1 and second axis A2. In further aspects, the print head 112 may be moved in the z-axis and the support bed 106 may be moved in the x,y-axis. Filament 114 is stored in one or more canisters 122 and provided to the print head 112 by a filament drive system 124. A vacuum system 126 is provided to secure the build plate 110 to the support bed 106. A controller 128 is provided to control the various functions of the three-dimensional printer 100.

Figure 2:
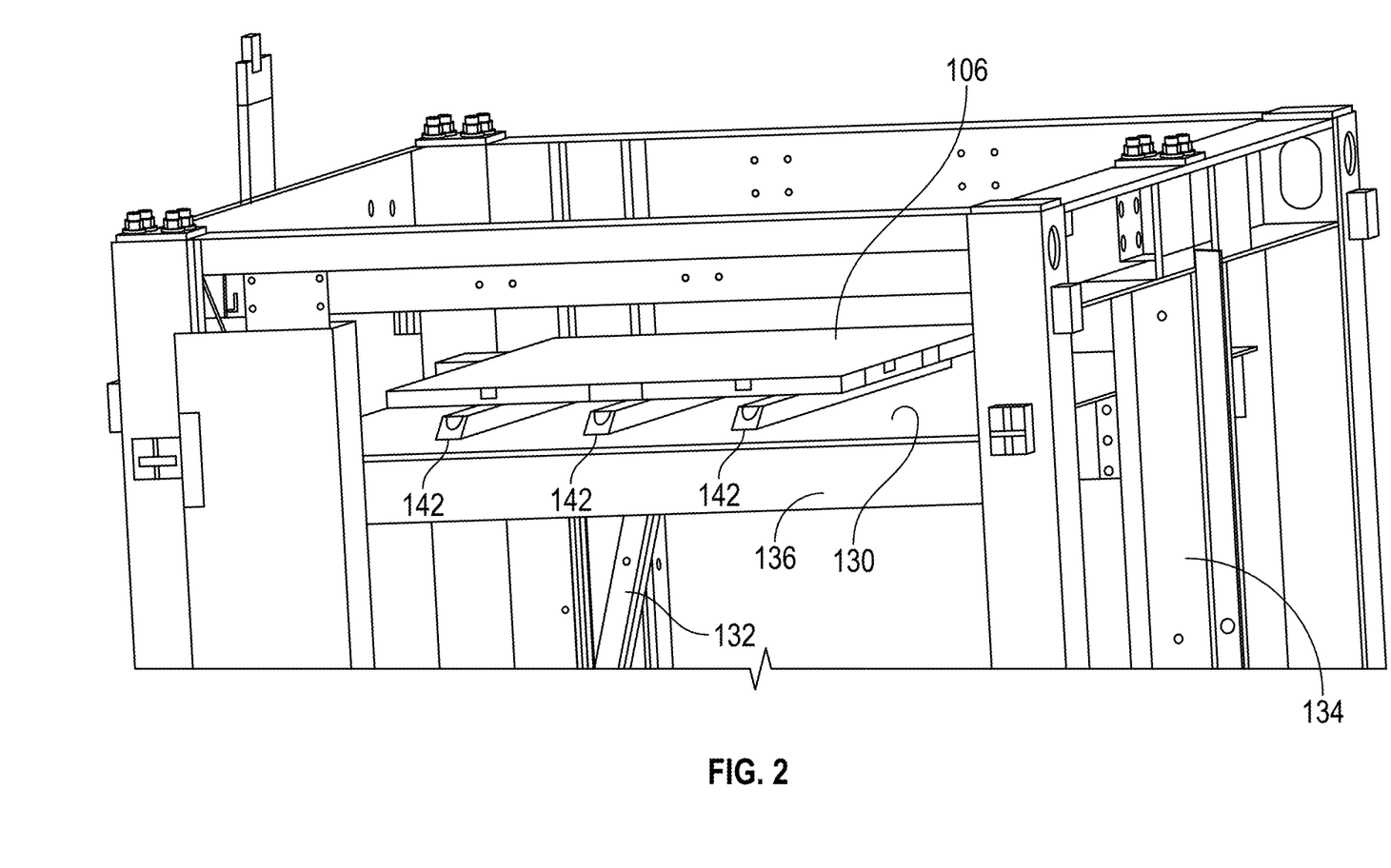
FIG. 2 illustrates an embodiment of a base plate, a support bed, and a support surface provided in the three-dimensional printer, in the frame of a three-dimensional printer with the shrouding removed.
Figure 3:
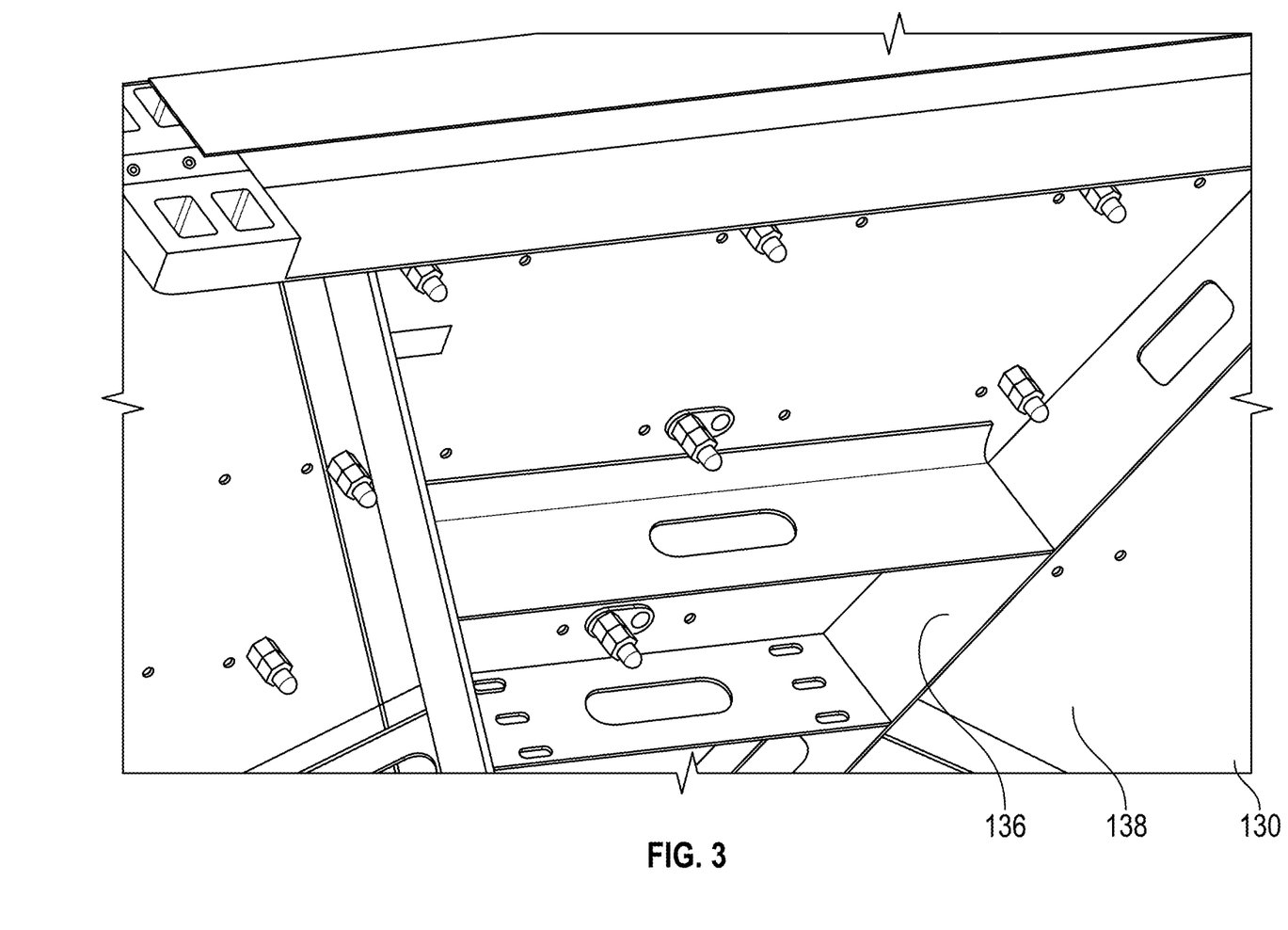
FIG. 3 illustrates a bottom view of an embodiment of a base plate.

Reference is made to FIG. 2, which illustrates a vacuum enabled support bed 106 adjustably mounted on a base plate 130. The base plate 130 is affixed to a z-axis scissor 132 and is coupled to at least one z-axis drive 134. In the illustrated aspect and with further reference to FIG. 3, the base plate 130 is connected to a support frame 136, which is fastened to the lower surface 138 of the base plate 130. The support bed 106 is mounted to the upper surface 140 of the base plate 130, wherein the upper surface 140 opposes the lower surface 138 of the base plate. In the illustrated aspects, three mounting bars 142; however, it should be appreciated that less than three or more than three mounted bars 142 may be present, such as from two to six mounting bars. In alternative aspects, the support bed 106 is mounted directly to the upper surface 140 of the base plate 130.

Figure 4A:
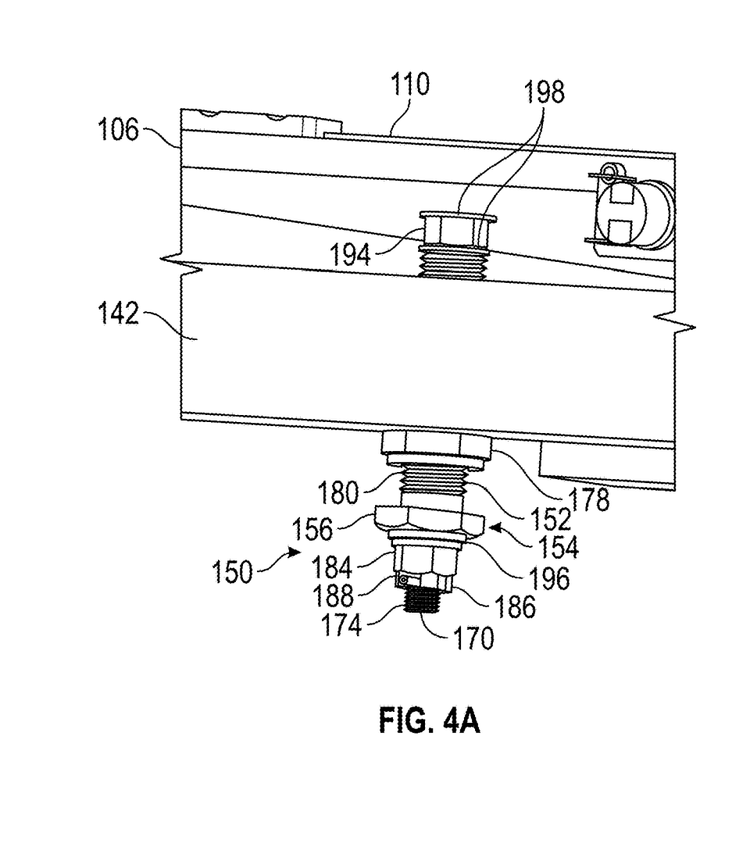
FIG. 4A illustrates a perspective view of an embodiment of an adjustable mounting assembly.
Figure 4B:
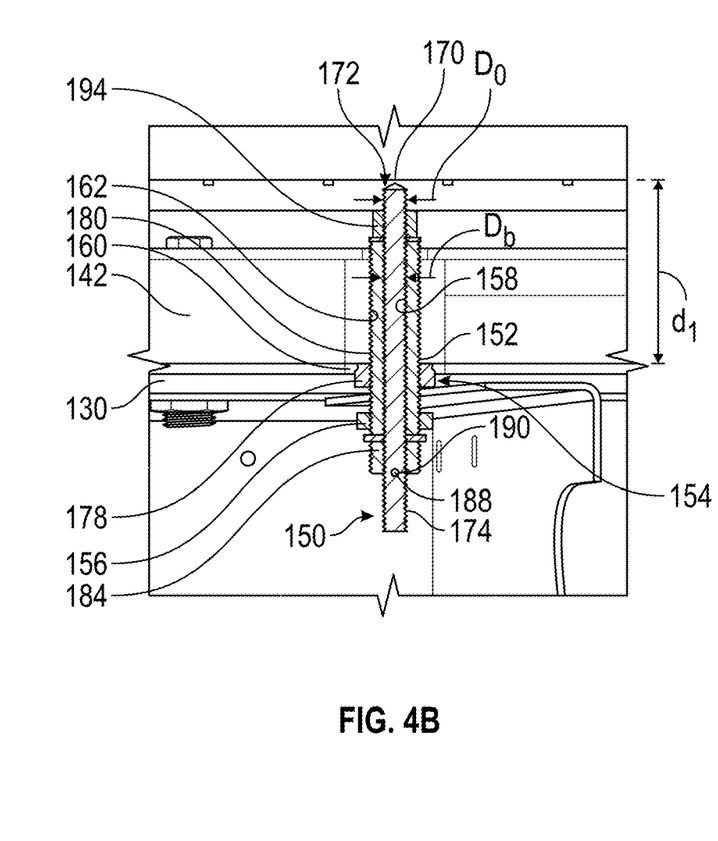
FIG. 4B illustrates a cross-sectional view of an embodiment of an adjustable mounting assembly.
Figure 4C:
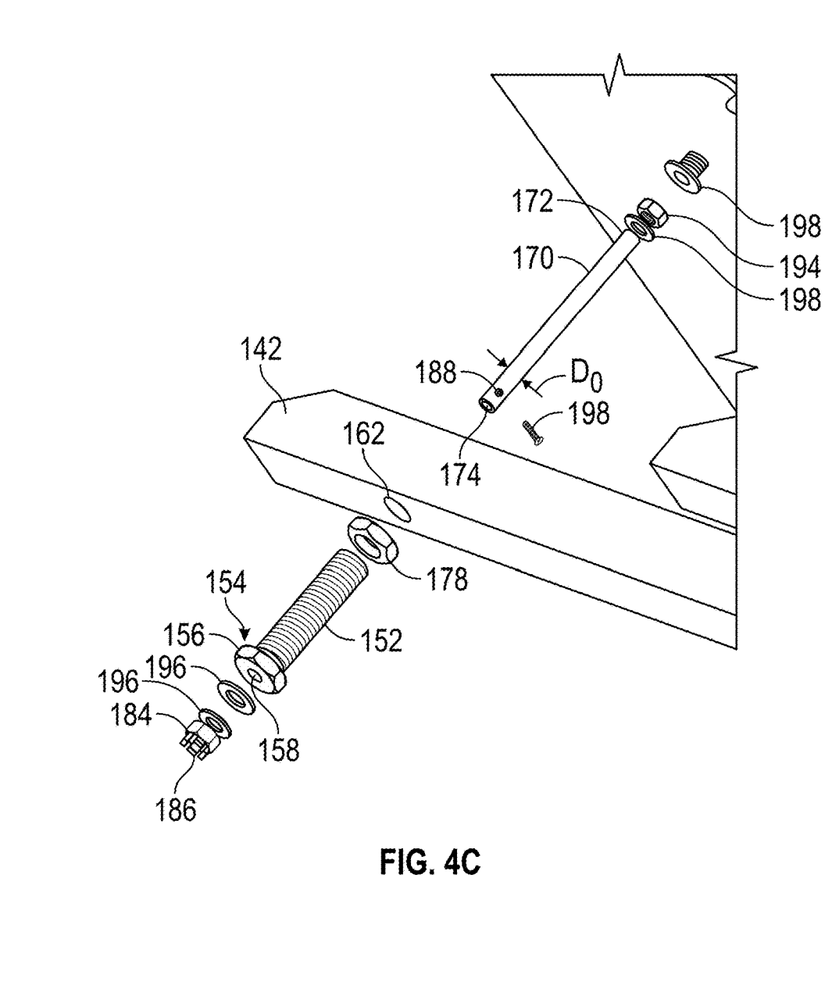
FIG. 4C illustrates an exploded view of an embodiment of an adjustable mounting assembly.

FIGS. 4A through 4C illustrate an adjustable mounting assembly 150 for mounting the support bed 106 to the base plate 130. As illustrated in FIG. 5, a plurality of adjustable mounting assemblies 150 (a portion of which are visible) are used mount the support bed 106 to the base plate 130 (not illustrated). Referring again to FIGS. 4A through 4C, each mounting assembly 150 includes a leveling bolt 152. The leveling bolt 152 defines, at a first end 154, a first nut 156. The leveling bolt 152 also defines a through bore 158. In aspects, the through bore 158 is threaded; and, in other aspects, the through bore 158 is smooth. The leveling bolt 152 passes through an opening 160 defined in the base plate 130 and an opening 162 defined in the mounting bar 142.

The adjustable mounting assemblies 150 also each include a threaded rod 170. The threaded rod 170 passes through the through bore 158 of the leveling bolt 152. The outer diameter Do of the threaded rod 170 is less than the diameter Db defined by the through bore 158 of the leveling bolt 152, allowing for the threaded rod 170 to shift in the through bore 158 when the process chamber 104 is heated during printing. In aspects, a difference in the diameters Do, Db is in the range of 1 millimeter to 3 millimeters, including all values and ranges therein. The threaded rod 170 is affixed to the support bed 106 at a first end 172. The threaded rod 170 extends through the through bore 158 of the leveling bolt 152 and the second end 174 of the threaded rod 170, which opposes the first end 172 of the threaded rod 170, extends out of the first end 154 of the leveling bolt 152. In aspects, the threads of the threaded rod 170 mate with threads provided in the support bed 106. In alternative or additional aspects, the threaded rod 170 is welded to the support bed 106.

A second nut 178 is adjustably positioned on the leveling bolt 152, which has threads on the external surface 180. The second nut 178 is positioned between the first nut 156 and the base plate 130 and mounting bar 142. Rotation of the first nut 156 adjusts a distance d1 of the support bed 106 relative to the base plate 130. Adjustment of the second nut 178 locks adjustable mounting assembly in place. A third nut 184 is also adjustably positioned on the threaded rod 170 proximal to the second end 172 of the threaded rod 170. In aspects, the third nut is a locking nut and defines an opening 186. The threaded rod 170 also defines a through hole 188 and a cotter pin 190 may be inserted through the opening 186 of the third nut 184 and through hole 188, locking the third nut 184 in place. In aspects, a fourth nut 194 is provided proximal to the first end 172 of the threaded rod 170. In aspects, the fourth nut 194 provides support for the threaded rod 170 and a stop for the leveling bolt 152. In aspects, one or more washers 196 are present between the first bolt 156 and the third bolt 184 and a washer 198 is present on either side of the fourth bolt 194.

Figure 5A:
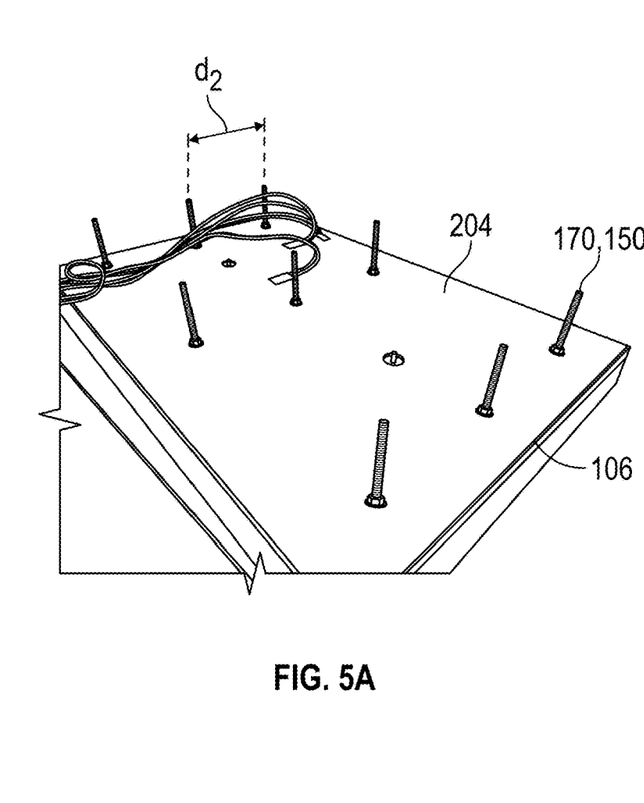
FIG. 5A illustrates a bottom view of an embodiment of a support bed.
Figure 5B:
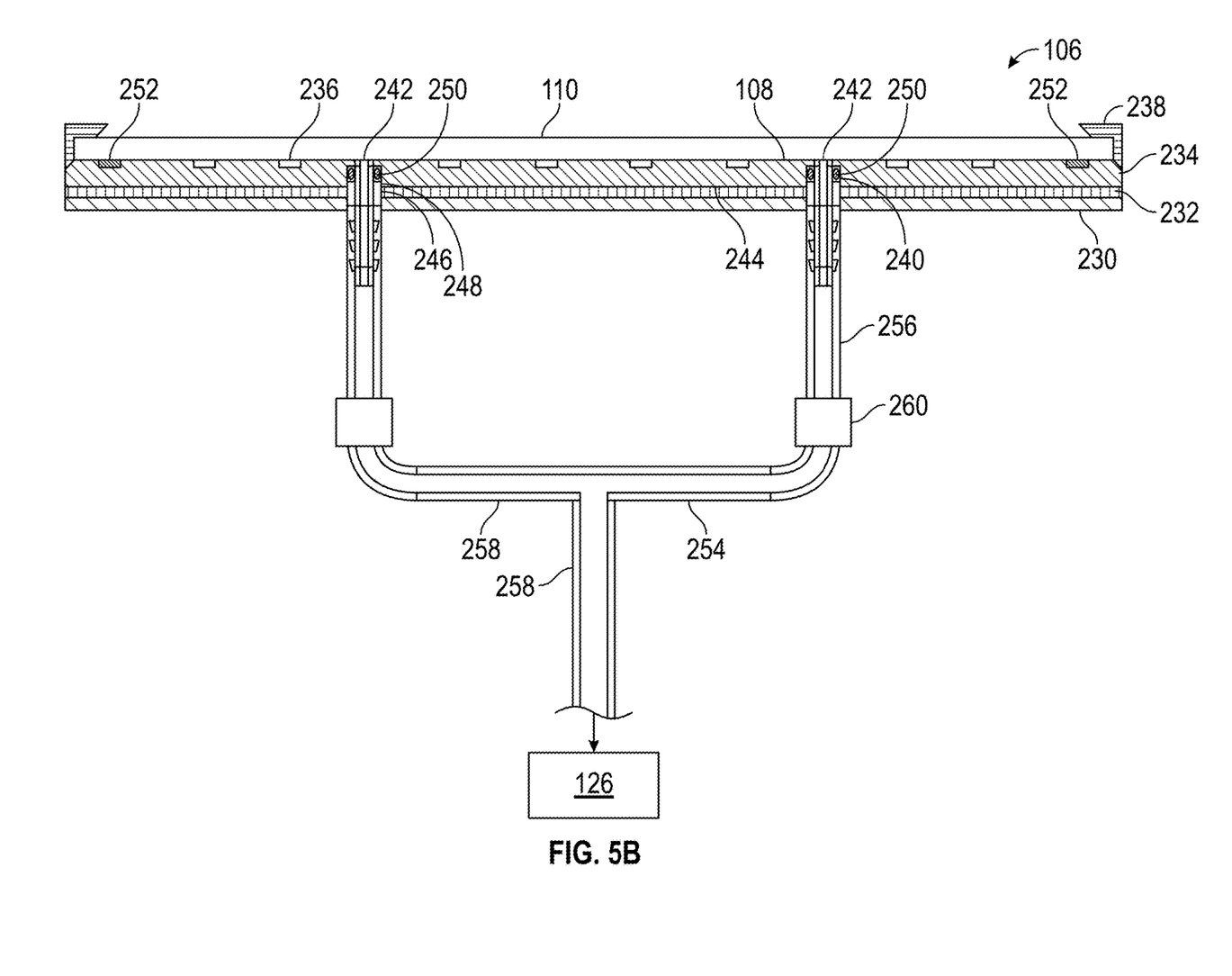
FIG. 5B illustrates a cross-sectional schematic of the support bed and vacuum ports.
Figure 5C:
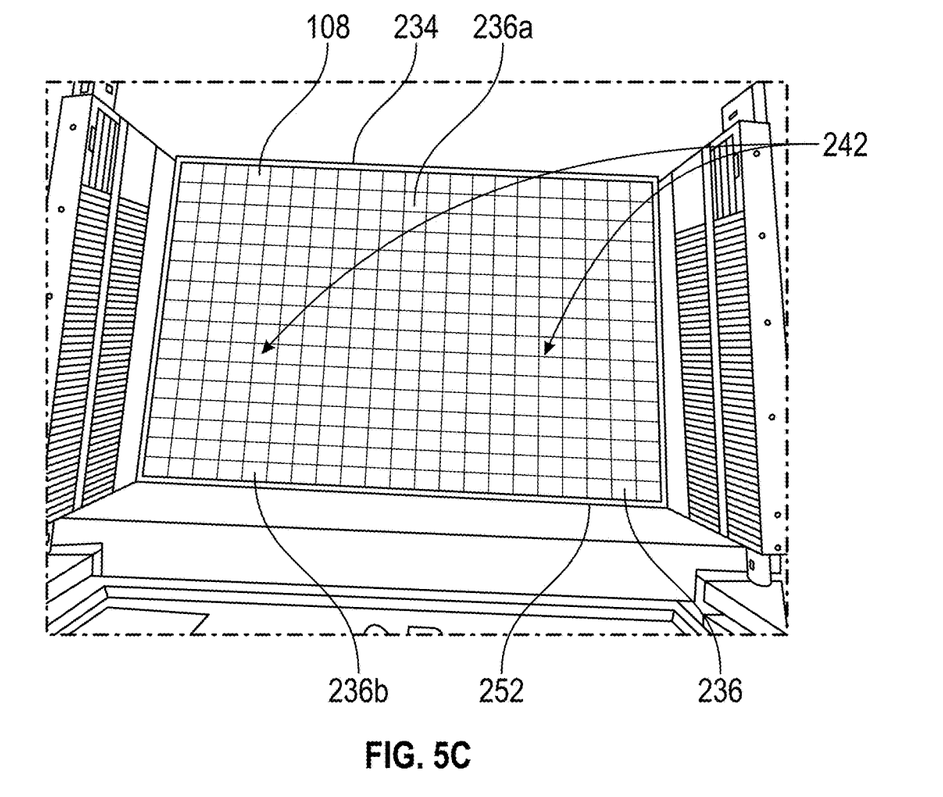
FIG. 5C illustrates a top view of an embodiment of a support bed and a support surface.

Turning now to FIGS. 5A through 5C, the support bed 106 is generally rectangular in shape but may assume alternate geometries, such as circular, oval, or square. FIG. 5A illustrates the placement of nine threaded rods 170 across the lower surface 204 of the support bed; however, it should be appreciated that more than nine or less than nine threaded rods 170, and thereby adjustable mounting assemblies 150, may be placed between the support bed 106 and base plate 130. The distance d1 (see FIG. 4B) is adjustable at each mounting assembly. Further, it is noted that adjacent adjustable mounting assemblies may be separated by a distance d2 in the range of 100 millimeters to 400 millimeters, including all values and ranges therein.

With reference to FIG. 5B, the support bed 106 is formed from one or more layers 230, 232, 234. In the aspect illustrated, a functional layer 232 is sandwiched between a composite layer 230 and a plate 234. The composite layer 230 includes, for example, a fiberglass-epoxy laminate composite or carbon fiber-epoxy laminate. In aspects, the composite layer 230 insulates and prevents or reduces warping. In aspects, the functional layer 232 includes at least one of one or more resistive heating elements and one or more thermal detectors. In aspects, the resistive heating elements provide a watt density in the range of 0.1 Watts per square centimeter to 0.3 Watts per square centimeter, including all values and ranges therein. The plate 234 provides the support surface 108. In aspects, the plate 234 includes, for example, stainless steel, aluminum, or an aluminum alloy, such as a 5000 to 7000 series aluminum. Further, in aspects, the plate 234 is formed by precision casting. Further, the plate 234 includes a number of grooves 236 defined in the support surface 108. With reference to FIG. 5C, in aspects, a first set of grooves 236a are provided across the support surface 108 of the plate 234 at a given interval, wherein the interval is in the range of 1 cm to 5 cm, including all values and ranges therein. A second set of grooves 236b are provided at an angle A to the first set of grooves 236a, wherein the angle A is in the range of 30 to 120 degrees, including all values and ranges therein, and is preferably 90 degrees. In addition, and returning to FIG. 5B, the plate 234 is relatively more rigid than the composite layer 230. Further, the support surface 108 of the plate 234 exhibits a flatness in the range of 0.00 mm to 1.00 mm over the entire length and width of the plate, including all values and ranges therein, such as less than 200 microns, at elevated temperatures of up to 180 degrees C., regardless of any other features such as the grooves defined in the support surface 108 once the support bed 106 is leveled by adjusting the adjustable mounting assemblies.

Figure 6:
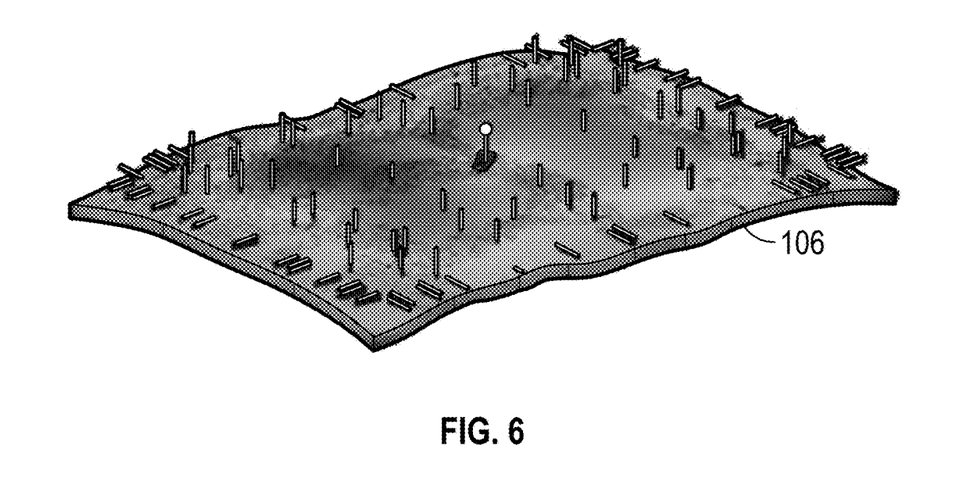
FIG. 6 illustrates the flatness of a support bed upon heating, where darker colors indicate greater deviations in flatness.

FIG. 6 illustrates simulated warpage of a support bed 106, wherein the plate 234 is formed of 5000-7000 series precision cast aluminum, assuming a coefficient of thermal expansion of 0.000024 m/mK. The darker the color the greater the deviation in the z-direction, or along the third axis A3. Through adjustment of the adjustable mounting assemblies 150, in the illustrated example, the maximum change in the z-direction was 125 microns at temperatures of 180° C., or a change in temperature of 155 K from room temperature.

The build plate 110 is placed on the support surface 108. In aspects, the build plate 110 is formed from materials such as polycarbonate, polypropylene, glass, spring steel, stainless steel, aluminum alloys, polyether imide, glycol modified polyethylene terephthalate, garolite, and polyamide including nylon 6. In aspects, the build plate 110 exhibits a thickness in the range of 0.5 millimeters to 2.5 millimeters, including all values and ranges therein. Preferably, the build plate 110 is compliant. In aspects, the material or composite forming the build plate exhibits a flexural modulus in the range of 1000 MPa to 12,000 MPa, including all values and ranges therein as measured according to ASTM D790, Method 1, 1.3 mm. In aspects, the build plate 110 is retained against the support surface 108 by the application of vacuum. In additional or alternative aspects, clips 238 are used to secure the edges of the build plate 110 against the support bed 106.

One or more vacuum ports 240 are provided in the support bed 106. The vacuum ports 240 are fluidly coupled to vacuum openings 242 defined in the support surface 108 and plate 234, wherein the fluid coupling provides a passage allowing gas or a liquid to pass from the vacuum openings 242 to the vacuum ports 240. In the illustrated aspect, the vacuum openings 242 are defined within the grooves 236a defined in the support surface 108. Thus, the vacuum ports 240 are in fluid communication with the grooves 236a, 236b by way of the vacuum openings, such that gas may pass from the grooves 236a, 236b into the vacuum openings 242 and through the vacuum ports 240. The vacuum ports 240 are secured to the rear surface 244 of the plate 234. In aspects, mechanical fasteners, such as threaded surfaces 246, 248 on the vacuum port 240 and plate 234, or an interference fit between the surfaces 246, 248 and the plate 234, are used to secure the vacuum ports 240 to the plate 234. In addition, a seal 250 is provided between the vacuum port 240 and the rear surface 244 of the plate 234. In aspects, the seal 250 is an o-ring formed from a flexible polymer. Alternatively, the seal 250 is formed from TEFLON tape, vacuum grease, or a thread sealant, applied to threaded surfaces. Each vacuum port 240 is fluidly coupled to the vacuum system 126. A gasket 252 is positioned between the build plate 110 and the support surface 108. In particular, the gasket 252 is placed within grooves 236 proximal to the periphery of the base plate 110 and around the vacuum openings 242.

In the illustrated aspects, the vacuum ports 240 are coupled to the vacuum system 126 by way of a vacuum manifold 254. The vacuum manifold 254 is provided by tubing 258, which is joined to the runners 256 affixed to each vacuum port 240. The tubing 258 illustrated and described herein may be formed from polymer material or metal or a metal alloy and exhibit sufficient flexural modulus so as not to collapse upon the application of vacuum. Further various fittings are used to couple the tubing to other portions of tubing, the vacuum ports 240 and other components of the vacuum system 126. In alternative aspects, a vacuum manifold 254 is provided by a manifold plate mounted to the plate 234. In such an aspect, the manifold plate includes a number of channels that form the runners 256 to fluidly couple the vacuum ports 240 to the vacuum system 126. In some aspects, shut off valves 260 are provided in each runner 256. It should therefore be appreciated that if the build plate 110 does not extend over a given vacuum opening 242, the shut off valve 260 associated with that vacuum opening 242 is activated and the gasket 252 geometry may be adjusted so as not to extend past the periphery of the build plate 110. Alternatively, vacuum openings 242 may be plugged if the build plate 110 does not extend over them.

Figure 7:
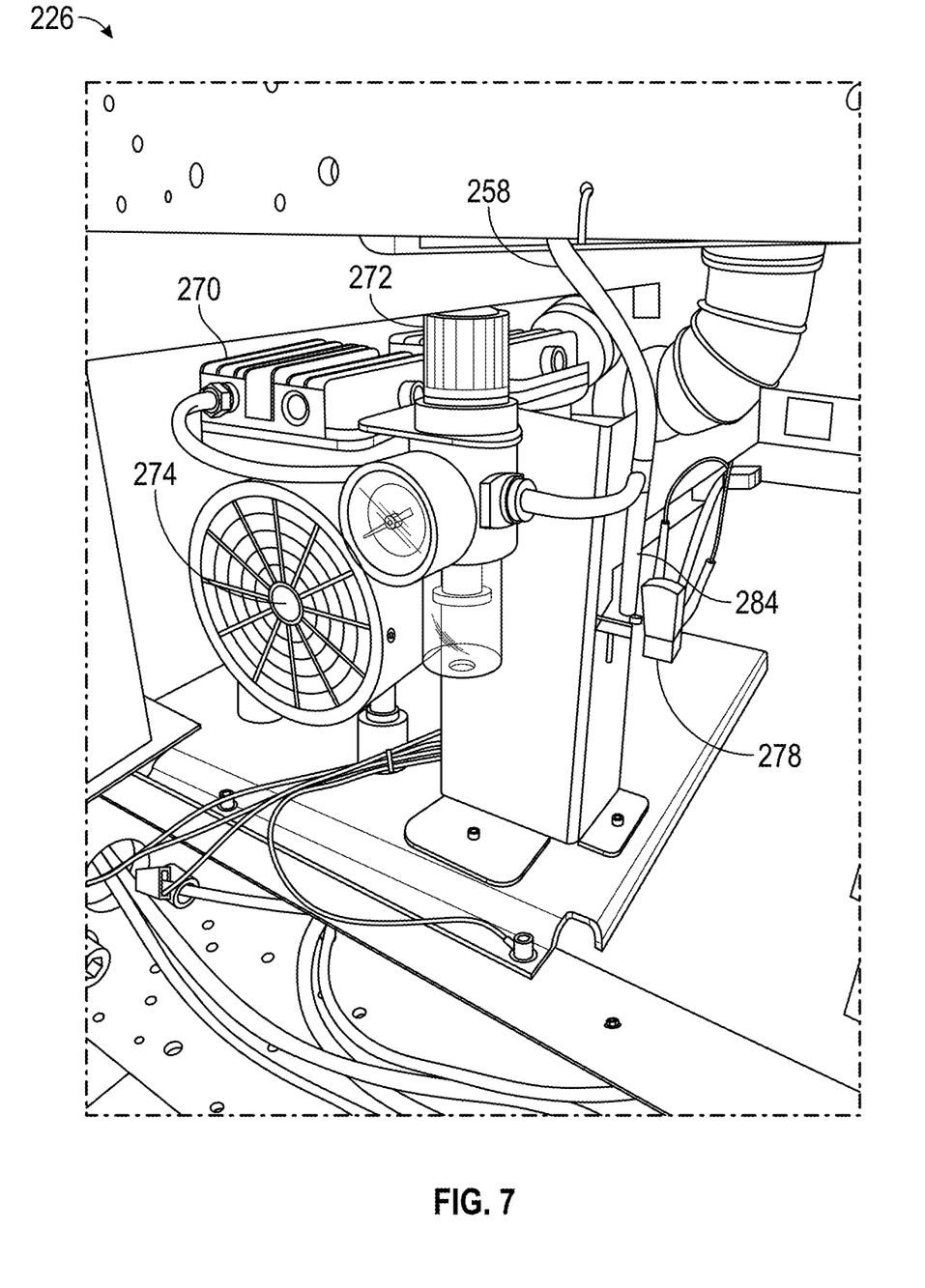
FIG. 7 illustrates an embodiment of a vacuum system.

With reference to FIG. 7, the vacuum system 126 includes a vacuum pump 270, a vacuum regulator 272, a vacuum gauge 274, and a vacuum pressure switch 278. The vacuum pump 270 is a positive displacement or mechanical vacuum pump, which is generally understood to operate by mechanically trap a volume of gas and expel it from the pump. Positive displacement vacuum pumps include, for example, a rotary vane pump, diaphragm pump, piston pump, scroll pump, wankel pump and a lobe pump. The vacuum pump 270 is in fluid communication with the vacuum port 240, which in aspects is provided by tubing 258. A vacuum regulator 272 for adjusting the amount of vacuum to apply is fluidly coupled to the tubing between the vacuum pump 270 and the vacuum port 240. In aspects, the degree of vacuum applied by the vacuum pump 270 provides a vacuum pressure of up to 100 kPa, including all values and ranges therein. The vacuum regulator 272 includes a vacuum gauge 274 for determining and adjusting the degree of vacuum applied. The vacuum regulator 272 is manually or electronically controlled. The vacuum regulator 272 is coupled, again by tubing 258, to the vacuum ports 240, in the illustrated aspect, by way of the vacuum manifold 254. A vacuum pressure switch 278 is coupled to the tubing 258 between the vacuum regulator 272 and the vacuum manifold 254. A feed line 284 provided by tubing couples the vacuum pressure switch 278 to the tubing 282 to the vacuum manifold 254. The vacuum pressure switch 278 is selected to operate at a system pressure in the range of 60 to 90 kPa, including all values and ranges therein. The vacuum pressure switch 278 is also selected to change state when the system pressure reaches a set point in the range of 60 to 90 kPa, including all values and ranges therein. Further, in aspects, to reduce instability in the system and accommodate for slight pressure oscillations, the vacuum pressure switch 278 exhibits a hysteresis in the range of 0.1 kPa to 10 kPa, including all values and ranges therein. The vacuum pressure switch 278 may be digital or mechanical. Preferably, in some aspects, the vacuum pressure switch 278 is a mechanical switch that actuates at a set point within the range noted above. The vacuum pressure switch 278 provides a control signal, such as a change in voltage, the presence of current due to the closing of an electrical circuit, or the absence of current due to the opening of an electrical circuit, when a pre-determined setpoint is reached in the vacuum system 126. In particular aspects, the vacuum pressure switch 278 may be a single pole single throw switch.

Figure 8:
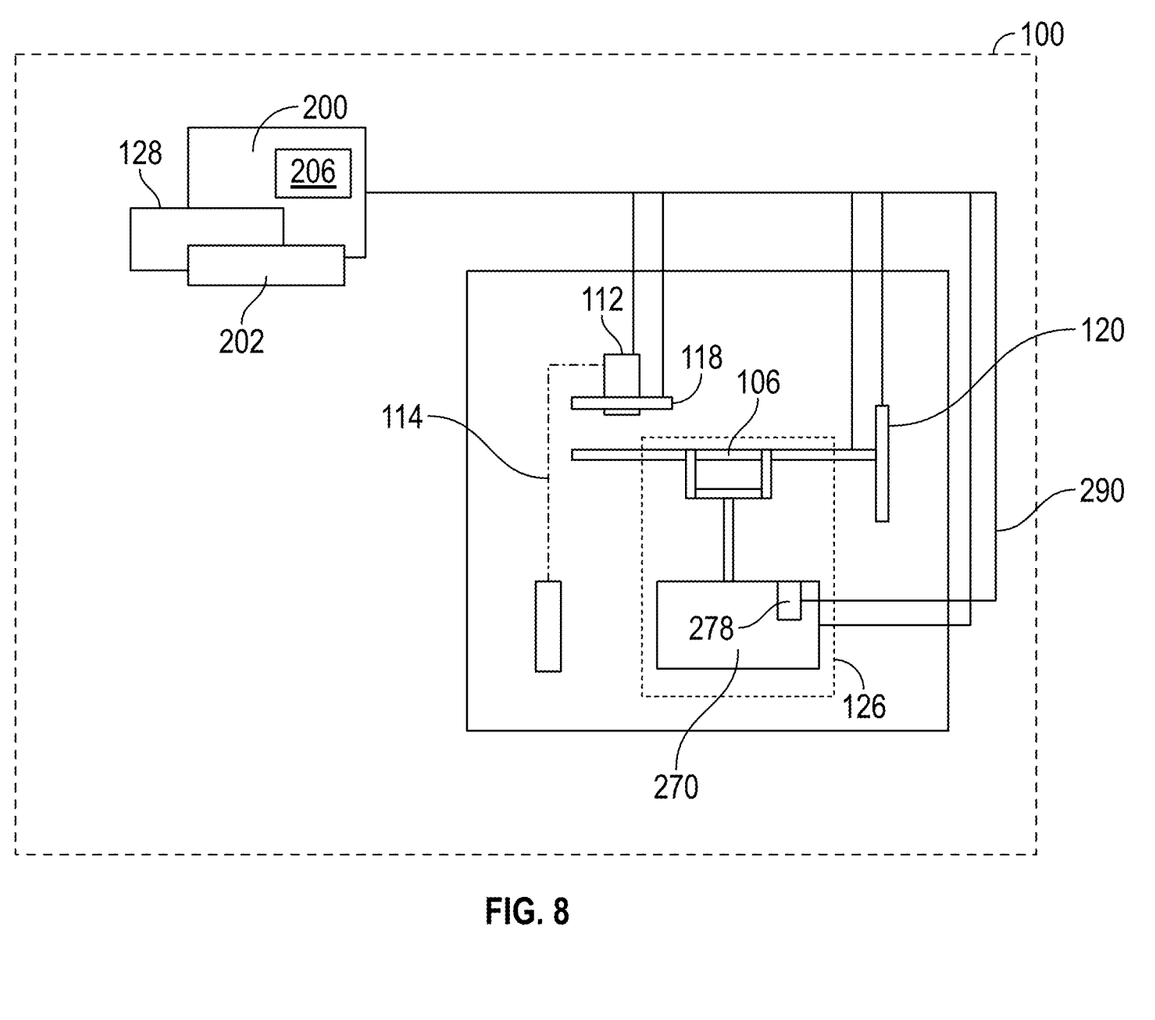
FIG. 8 illustrates a schematic of an embodiment of a three-dimensional printer control system.

FIG. 8 illustrates a schematic of a controller 128 for operating the three-dimensional printer 100. The controller 128 is connected to the print head 112, x,y-axis gantry 118, z-axis gantry 120, and support bed 106, vacuum pump 270, vacuum regulator 272, and vacuum pressure switch 278. In further aspects, the vacuum gauge 274 is a digital vacuum gauge 274 and connected to the controller 128. The connections between the controller 128 and the various other components of the three-dimensional printer 100 include electrical, wired connections or wireless connections effected by one or more wireless communication protocols. The controller 128 includes one or more processors 200, which in aspects include one or more microprocessors. Further the controller 128 includes an interface 202, including one or more visual or audio displays and one or more input devices, such as a keyboard, touch screen or mouse. In addition, the controller includes one or more analog to digital converters for converting analog inputs into digital inputs for use by the controller 128.

The controller 128 is coupled to the vacuum pressure switch 278, in the illustrated aspect, by a wired connection including wires 290 extending from the vacuum pressure switch 278. When the applied vacuum drops and the system pressure increases beyond a given set point, the vacuum pressure switch 278 provides feedback to the controller 128 by way of a change in state, which in aspects is the result of the opening and closing of a circuit, wherein the change in change in state of the circuit represents that pressure in the vacuum system 126 has reached an undesirable level in which it is possible that the build plate 110 may slip relative to the support surface 108 and printing should cease or, if printing has not begun, printing should not be commenced. In aspects where a change in state of the circuit is used, a normally open vacuum switch may be deployed. Triggering of the vacuum switch closes a circuit, which results in a voltage difference that is detected by the controller 128. In aspects, the controller 128 provides an indicator, which may be received by a user, by way of the interface 202, such as an audio or visual indicator, that the pressure in the vacuum system 126 has reached an undesirable level. The controller 128 includes executable code to carry out the methods described herein. In aspects, the executable code is stored in memory 206 accessible by the one or more processors 200, including non-transitory memory such as computer readable media including read only memory, random access memory, volatile memory, flash drives, compact discs, digital versatile discs.

Figure 9:
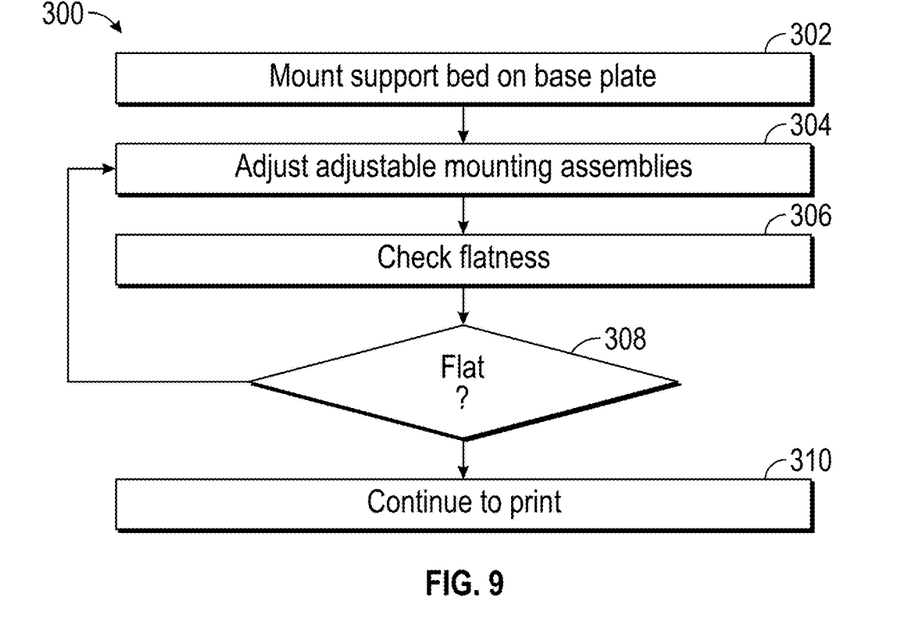
FIG. 9 illustrates an embodiment of a method of leveling a support bed in a three-dimensional printer.

With reference to FIG. 9, and further reference to FIGS. 1 through 8, a method 300 for leveling a support bed 106 is provided. At block 302, the support bed 106 is mounted to a base plate 130, with or without the use of mounting bars 142, using a plurality of adjustable mounting assemblies 150. At block 304 the adjustable mounting assemblies are adjusted to alter the distance d1 between the support surface 108 and the base plate 130 to obtain a desired degree of flatness of the support surface 108, such as in the range of 0.0 millimeters to 1.00 millimeters, including all values and ranges therein such as 0.1-0.2 millimeters. At block 306, the flatness of the support surface 108 is checked. If it is determined at block 308 the support surface 108 is not sufficiently flat and does not exhibit sufficient flatness, then the distances d1 at each adjustable mounting assembly 150 may be adjusted again at block 304. If at block 308, it is determined the support surface 108 exhibits sufficient flatness, then printing may begin or continue at block 310. In particular aspects, the method includes heating the process chamber, the support bed, base plate, and mounting bars, to an operating temperature, which, in aspects, may be an average temperature that it is estimated that the process chamber 104 will be operated at during use. Otherwise, the support bed 106 may be leveled at room temperature.

Figure 10:
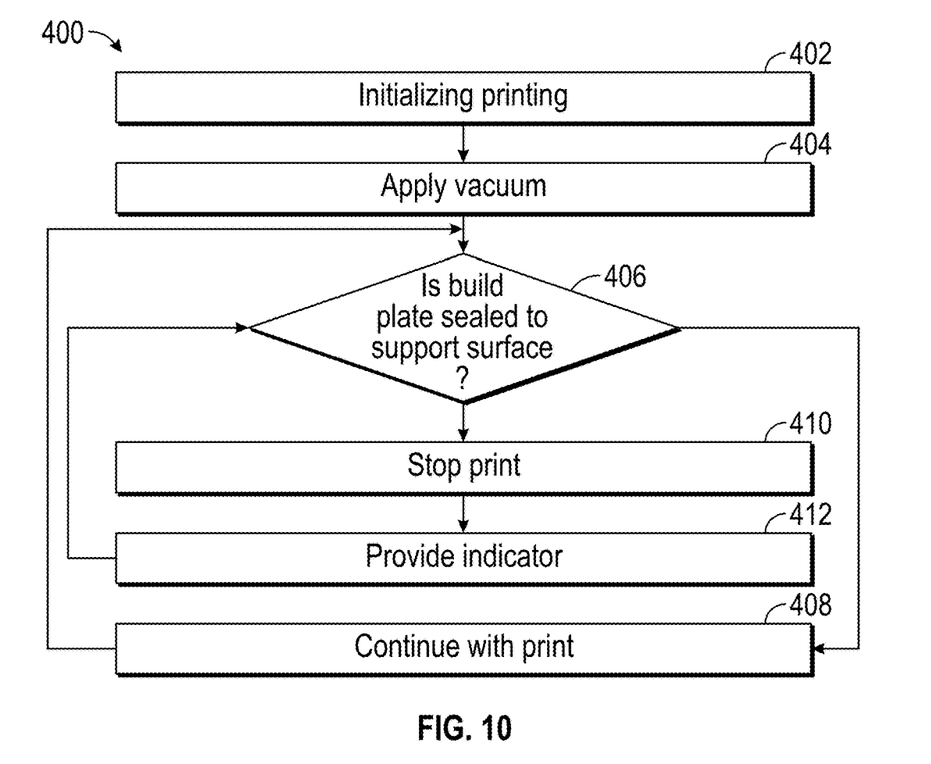
FIG. 10 illustrates an embodiment of a method of controlling a three-dimensional printer.

With reference to FIG. 10, and further reference to FIGS. 1 through 8, a method 400 for detecting the adhesion of a build plate 110 to the surface 108 of a support plate 108 is also provided herein. At block 402 instructions for three dimensionally printing an object 116 are received by the controller 128. If the printer 100 is not already initialized for printing, the three-dimensional printer 100 receives the instructions and proceeds to initialize printing, including, performing one of more of the following actions: heating up an extrusion nozzle in the print head 112, warming up the support bed 106, warming up the process chamber 104, locating the print head 112 in the process chamber 104, locating the support bed 106 relative to the print head 112. In addition, at block 404 the vacuum pump 270 in the vacuum system 126 is activated, either manually or by the controller 128, and applies vacuum to the build plate 110. If the build plate 110 is improperly situated on, or not positioned on the support surface 108 of the support bed 106, or if the support bed 106 is not sufficiently level or if the build plate 110 is insufficiently compliant and too rigid to conform to the support surface 108, then the desired pressure set point will not be reached and the vacuum pressure switch 278 will activate. If a print is already in progress, the desired pressure set point will be exceeded and the vacuum pressure switch 278 will activate.

At block 406 the controller 128 checks to determine if the build plate 110 is sealed to the support surface 108 of the support bed 106. In aspects, the controller 128 determines the state of the vacuum pressure switch 278 by assessing whether the vacuum pressure switch 278 has provided or is providing a control signal, in the form of a change state, including in examples a change in voltage, the presence of current, or the absence of current, to the controller 128. In aspects, the receipt of a control signal by the controller 128 may set a flag query-able by the processor 200 or may be logged in a look up table stored in non-transient memory accessible by the processor 200. In alternative aspects, the control signal may provide an interrupt that forces the controller 128 into a subroutine. Optionally, the query by the controller 128 may be performed at regular time intervals. If the vacuum pressure switch 278 state indicates sufficient vacuum is maintained wherein the pressure is maintained at or above a set point, at block 408, the printer continues with the print. Optionally, the controller 128 may continue to check to the state of the vacuum pressure switch 278. If, at block 406, the vacuum pressure switch 278 state indicates the pressure in the vacuum system 126 is below a set point and there is insufficient vacuum to hold the build plate 110 against the support surface 108, then printing is ceased at block 410. At block 412, an indicator, including at least one of a visual indicator and an audio indicator, are provided by the controller 128. The controller 128 may then continue to poll the state of the vacuum pressure switch 278 until the build plate 110 is repositioned on the support surface 108 of the support bed 106, the printer 100 is shut off, or the print is reinitialized at block 402.

According to various aspects an advantage of the present disclosure is the provision of a relatively flat build plate 110, exhibiting a flatness of 1.00 millimeters or less, and in particular less than 200 microns, at temperatures of up to 180° C., reducing defects in a three-dimensional printed object 116. A further advantage of the present disclosure is the ability to use the entire build plate 110 for printing a three-dimensional object, rather than just being isolate to a flatter portion of the build plate 110.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A three-dimensional printer, comprising:
 a base plate including an upper surface and a lower surface opposing the upper surface;
 a support bed, including a support surface, wherein the support bed is mounted to the base plate; and
 a plurality of adjustable mounting assemblies mounting the base plate to the support bed, wherein each adjustable mount assembly separates the base plate from the support bed by a first distance, and wherein each mounting assembly includes:
 a leveling bolt, wherein the leveling bolt includes a first nut defined at a first end of the leveling bolt and defines a through bore, wherein the leveling bolt passes through the base plate;
 a threaded rod passing through the through bore defined by the leveling bolt, the threaded rod including a first end and a second end opposing the first end, the first end of the threaded rod affixed to the support bed;
 a second nut adjustably positioned on the leveling bolt, between the first end of the leveling bold and the lower surface of the base plate; and
 a third nut adjustably positioned on the threaded rod proximal to the second end of the threaded rod.

2. The three-dimensional printer of claim 1, wherein each mounting assembly includes a fourth nut adjustably positioned on the threaded rod of each mounting assembly between the base plate and the support plate.

3. The three-dimensional printer of claim 1, wherein the third nut of each mounting assembly is a lock nut including a cotter pin, wherein the cotter pin of each mounting assembly is received in an opening defined in the threaded rod of each mounting assembly.

4. The three-dimensional printer of claim 1, further comprising a mounting bar affixed to the base plate, wherein the mounting bar is positioned between the support bed and the base plate and the leveling bolt of each mounting assembly passes through one of a plurality of openings in the mounting bar.

5. The three-dimensional printer of claim 1, further comprising a print head, wherein the print head is movable in a plane defined by a first axis and a second axis, and the base plate is movable in a third axes orthogonal to the plane.

6. The three-dimensional printer of claim 1, wherein each adjustable mounting assembly is located at a second distance apart from an adjacent adjustable mounting assembly, wherein the second distance is in a range of 100 mm to 400 mm.

7. The three-dimensional printer of claim 1, further comprising a build plate disposed on the support surface.

8. The three-dimensional printer of claim 7, further comprising:
   a vacuum port affixed to the support bed in fluid communication with a vacuum opening defined in the support surface, wherein the build plate is disposed over the vacuum opening;
   a vacuum pump in fluid communication with the vacuum port wherein the fluid communication is provided by a tubing;
   a vacuum regulator coupled to the tubing between the vacuum pump and vacuum port; and
   a vacuum pressure switch coupled to the tubing between the vacuum regulator and the vacuum port.

9. The three-dimensional printer of claim 8, further comprising a gasket affixed to the support surface, wherein the gasket surrounds the vacuum port.

10. The three-dimensional printer of claim 8, wherein the support bed includes grooves defined in the support surface.

11. The three-dimensional printer of claim 10, wherein the vacuum opening is defined in one of the grooves.

12. The three-dimensional printer of claim 8, wherein the vacuum pressure switch exhibits a hysteresis in the range of 0.1 kPa to 10 kPa.

13. The three-dimensional printer of claim 8, further comprising a controller, wherein the controller includes executable code to:
   initializing printing;
   activating the vacuum pump;
   determining a state of the vacuum pressure switch; and
   stopping printing if a state of the vacuum pressure switch is changed.

14. The three-dimensional printer of claim 13, wherein the controller further includes executable code to:
   provide an indicator the state of the vacuum pressure switch is changed.

15. A method of leveling a build surface, comprising:
   mounting a support bed, including a support surface, onto a base plate using a plurality of adjustable mounting assemblies;
   adjusting a first distance between the base plate and the support bed at each of the plurality of adjustable mounting assemblies, wherein each mounting assembly includes: a leveling bolt, wherein the leveling bolt includes a first nut defined at a first end of the leveling bolt and defines a through bore, wherein the leveling bolt passes through the base plate, a threaded rod passing through the through bore defined by the leveling bolt, the threaded rod including a first end and a second end opposing the first end, the first end of the threaded rod affixed to the support bed, a second nut adjustably positioned on the leveling bolt, between the first end of the leveling bold and the lower surface of the base plate, and a third nut adjustably positioned on the threaded rod proximal to the second end of the threaded rod, and wherein the first distance is adjusted by rotating the first nut of at least one of each mounting assembly, locking the adjustable mounting assembly in place by adjusting the second nut of the at least one mounting assembly, and adjusting the third nut of the at least one mounting assembly; and
   leveling the support surface.

16. The method of claim 15 further comprising adjusting a temperature of the support bed and the base plate to an operating temperature prior to adjusting the first distance at each of the plurality of adjustable mounting assembly.

* * * * *